United States Patent [19]

Borowiec et al.

[11] Patent Number: 5,012,161
[45] Date of Patent: Apr. 30, 1991

[54] POWER FACTOR CORRECTION CIRCUIT

[75] Inventors: Joseph C. Borowiec; Sayed-Amr El-Hamamsy, both of Schenectady, N.Y.

[73] Assignee: General Electric Company, Schenectady, N.Y.

[21] Appl. No.: 295,624

[22] Filed: Jan. 5, 1989

[51] Int. Cl.⁵ .......................................... H05B 41/24
[52] U.S. Cl. ...................................... 315/247; 363/89; 363/126
[58] Field of Search ................... 315/247; 363/89, 126

[56] References Cited

U.S. PATENT DOCUMENTS

| | | | |
|---|---|---|---|
| 4,109,307 | 8/1978 | Knoll | 315/247 X |
| 4,672,528 | 6/1987 | Park et al. | 363/98 |
| 4,683,529 | 7/1987 | Bucher | 363/44 |
| 4,801,887 | 1/1989 | Wegener | 363/126 X |
| 4,812,736 | 3/1989 | Albach et al. | 363/89 X |
| 4,831,508 | 5/1989 | Hunter | 363/44 |
| 4,855,890 | 8/1989 | Kammiller | 363/44 |

OTHER PUBLICATIONS

S. A. El-Hamamsy, "Controlled Leakage Transformer for Fluorescent Lamp Ballast Including Integral Ballasting Inductor", Ser. No. 200,881 filed 6/2/88.

J. S. Spangler, "A Power Factor Corrected MOSFET, Multiple Output, Flyback Switching Supply", Proceedings of the 10th International PCI, Chicago, IL, 1985, pp. 19–32.

Primary Examiner—Eugene R. LaRoche
Assistant Examiner—Do Hyun Yoo
Attorney, Agent, or Firm—Jill M. Breedlove; James C. Davis, Jr.; Marvin Snyder

[57] ABSTRACT

A power factor correction circuit employs a metal oxide varistor in series with a filter capacitor. The varistor provides a low-impedance path for pre-charging the filter capacitor, thus enabling the avoidance of high inrush current to circuit devices, while the filter capacitor energizes the circuit when the capacitor voltage exceeds the AC source voltage. The circuit is insensitive to normal line transients. One application is for use in a gas discharge lamp ballast.

10 Claims, 3 Drawing Sheets phrase# POWER FACTOR CORRECTION CIRCUIT

FIELD OF THE INVENTION

The present invention relates generally to power circuits for obtaining a high power factor electronically. More particularly, this invention relates to a power factor correction circuit for use in an electronic ballast for gas discharge lamps which pre-charges the energy-storage or filter capacitor before the circuit oscillates, thereby avoiding destructive inrush current through circuit devices.

BACKGROUND OF THE INVENTION

The power factor of a system is defined as real input power divided by apparent input power. Apparent power is calculated by multiplying root mean square (RMS) voltage and RMS current. Therefore, a system with a lower power factor requires larger input currents for a given real power than a system with a higher power factor.

Electronic circuits, such as gas discharge lamp ballasts, generally operate from DC voltages. Hence, a means for converting AC line voltage to DC line voltage is required. A conventional way to obtain a DC voltage from an alternating voltage source is through rectification and capacitive filtering. However, in a circuit used to accomplish this result, the power factor, which depends upon the value of the filter capacitor and the size of the load, is often too low. Therefore, the input current necessary to support input power is very high and can exceed the ratings of conductors and circuit breakers.

Reducing the filter capacitor value improves the power factor, but increases the ripple on the output voltage. This is undesirable because gas discharge lamp ballasts have a further requirement that the ripple on the output voltage not exceed a certain value. This ripple specification, known as the crest factor, is obtained by dividing the peak output voltage by the RMS output voltage. The crest factor is required to be less than 1.6 for fluorescent lamps, for example, because a higher crest factor is known to adversely affect the operating life of the lamp. As a result, the requirements of higher power factor and lower crest factor are in conflict.

The lighting industry has long recognized the advantages of high power factor circuits, and thus a power factor greater than 0.9 has become a de facto requirement of ballasts for gas discharge lamps. Conventional, or electromagnetic, ballasts for gas discharge lamps include bulky low-frequency transformers and inductors and large power factor correction capacitors. The inductors and transformers are necessary to limit the current in the lamps once they are ignited. This is due to the negative impedance characteristic of gas discharge lamps; that is, once the arc of a discharge lamp has been ignited, the current through the discharge medium increases, while the voltage drop between the lamp electrodes decreases. Therefore, an electromagnetic ballast acts as an inductive load, and a large power factor correction capacitor is used to increase the power factor.

In contrast to conventional electromagnetic ballasts, the load presented by electronic ballasts to the AC line is capacitive. This is due, in part, to the above-described filter capacitors. In addition, smaller transformers and inductors are used because electronic ballasts operate at higher frequencies, i.e. 20-50 kHz. Thus, a power factor correction circuit is needed to correct for a capacitive load at high frequency operation.

OBJECTS OF THE INVENTION

It is, therefore, an object of the present invention to provide a new and improved power factor correction circuit for electronically obtaining a high power factor.

Another object of this invention is to provide a new, improved power factor correction circuit in which a filter capacitor is pre-charged before the circuit oscillates, thus avoiding high inrush currents through circuit devices.

Still another important object of this invention is to provide a new, improved power factor correction circuit requiring a lower filter capacitor voltage level, thus enabling the use of a smaller filter capacitor, while achieving a high power factor without a significant ripple voltage.

Yet another object of the present invention is to provide a new, improved power factor correction circuit having transient protection capability.

SUMMARY OF THE INVENTION

These and other objects are achieved in a new power factor correction circuit for obtaining a high power factor electronically. The preferred embodiment of the present invention comprises a metal oxide varistor in series with a filter or energy-storage capacitor. The varistor provides a low-impedance path for pre-charging the capacitor to a pre-selected fixed voltage level before the circuit oscillates. Once the capacitor is pre-charged, the varistor becomes an essentially non-conductive path, except when transients occur. A power factor correction transformer maintains the charge across the capacitor. Thereafter, when the AC source voltage goes below the rectified line voltage, a coasting device means becomes conductive to enable the capacitor to discharge current to a load. During the time for which the capacitor is being charged by the power factor correction transformer, the load is energized by a fully rectified line voltage.

Advantageously, by pre-charging the filter capacitor according to the present invention, devices in the circuit are not required to withstand high inrush currents. In addition, the varistor provides transient protection by effectively placing the capacitor across the line to absorb high voltage transients.

A further advantage results from the fact that the presence of the varistor decreases the voltage level across the filter capacitor. The reason is that the varistor can maintain a voltage drop up to the value of its breakdown voltage. Hence, a capacitor with a lower voltage rating may be used without affecting reliability of the circuit.

The features and advantages of the present invention will become apparent from the following Detailed Description of the Invention when read with the accompanying drawings.

DETAILED DESCRIPTION OF THE INVENTION

Figure 1:
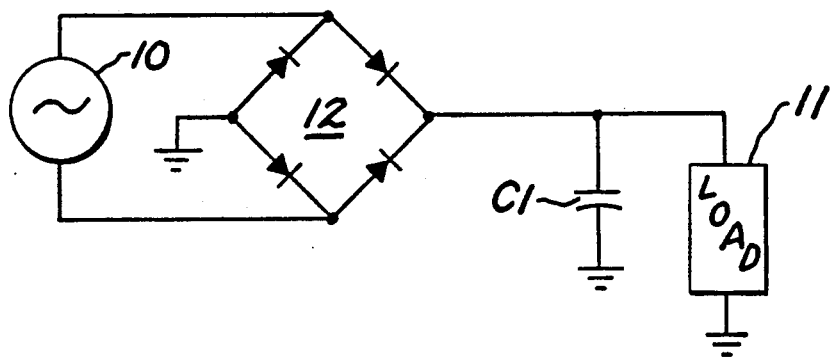
FIG. 1 is a schematic circuit diagram illustrating a conventional rectification and capacitive filtering scheme for obtaining a DC signal from an alternating voltage source.

An exemplary conventional rectification circuit is illustrated in FIG. 1 which includes an AC source 10 connected across a full-wave diode bridge rectifier 12, and a filter capacitor C1 in parallel with a load 11 connected to the bridge output terminals. In FIG. 1, a DC voltage across load 11 is obtained by supplying voltage from AC source 10 to full-wave diode bridge rectifier 12 and smoothing the DC voltage by operation of filter capacitor C1. As hereinbefore explained, the power factor of such a circuit is generally too low for many applications, such as gas discharge lamp ballast circuits.

Figure 2:
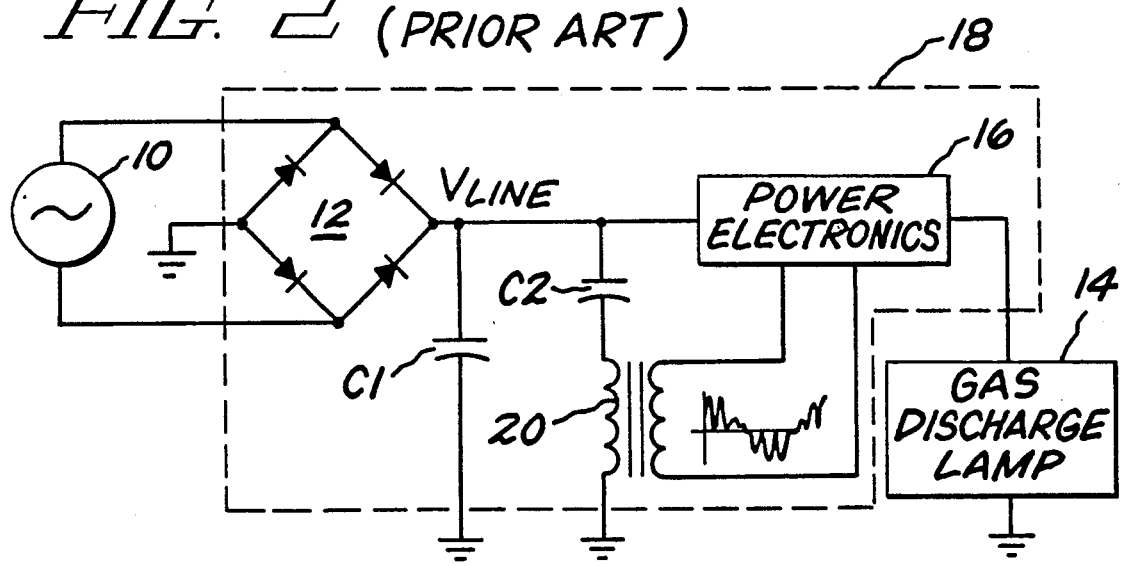
FIG. 2 is a schematic circuit diagram illustrating a power factor correction circuit known in the prior art.

A "bucket brigade" approach to power factor correction, which is known in the prior art, is illustrated in FIG. 2. Like the circuit of FIG. 1, this circuit includes AC source 10 connected across full-wave diode bridge rectifier 12 and filter capacitor C1. The load in the circuit of FIG. 2 comprises a gas discharge lamp 14 and power electronics 16. Moreover, dashed lines 18 enclose a typical ballast circuit. In such a typical ballast circuit, as will be appreciated by those of ordinary skill in the art, power electronics 16 may include switching devices, control logic, high-frequency inductors and transformers, capacitors and/or other circuitry necessary for the operation of a gas discharge lamp. FIG. 2 also includes a series-connected capacitor C2 and secondary winding of a transformer 20 connected across filter capacitor C1. The primary winding of transformer 20 is coupled to power electronics 16. One end of capacitor C2 is driven by an alternating high frequency voltage supplied to transformer 20 by the power electronics so that the voltage on the other end of capacitor C2 is alternately higher and lower than the AC line voltage, $V_{LINE}$. When the sum of the voltages across capacitor C2 and secondary of transformer 20 is greater than $V_{LINE}$, capacitor C2 discharges to filter capacitor C1 and to gas discharge lamp 14 via the power electronics. When the sum of these voltages is less than $V_{LINE}$, current flows from the line to capacitor C2 through diode bridge rectifier 12 to the lamp. The result is an increased diode bridge conduction angle and, therefore, an increased power factor. As used herein, conduction angle is defined as the angle per 360 degrees for which a diode pair of bridge rectifier 12 conducts during a 60 Hz cycle. Disadvantageously, however, the input signal from the power electronics to the transformer is complex, and high frequency filtering (not shown) of this signal is required. The result is a complex and costly scheme for raising power factor.

Figure 3:
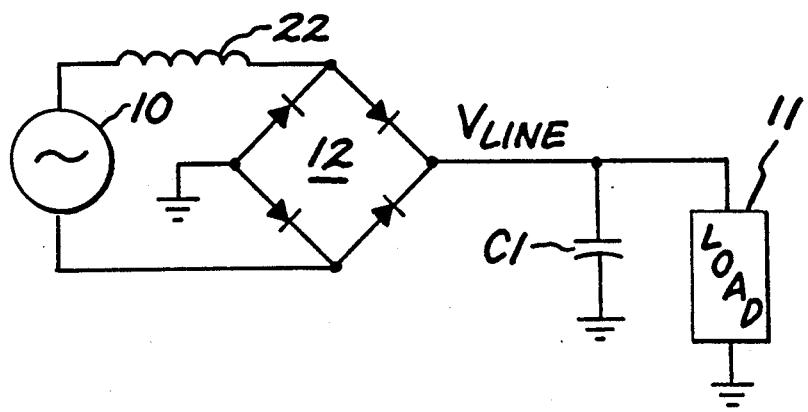
FIG. 3 is a schematic circuit diagram illustrating another power factor correction circuit known in the prior art.

Another conventional power factor correction method differs from that shown in FIG. 1 by using one or more external inductors 22 at the input to rectifier 12, as shown in FIG. 3. Although power factor is increased, the inductor(s) required is bulky and expensive.

Figure 4:
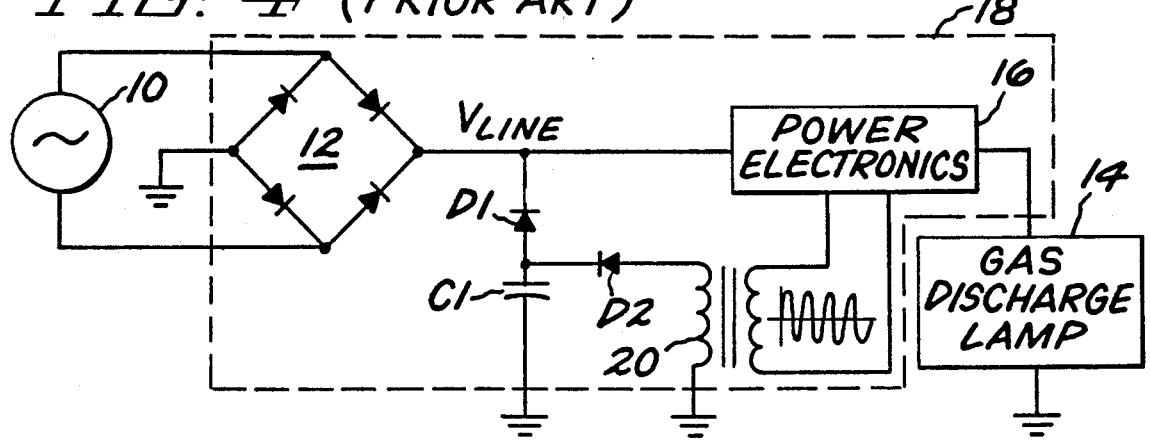
FIG. 4 is a schematic circuit diagram illustrating still another power factor correction circuit known in the prior art.

Still another technique for increasing power factor has been described by J.S. Spangles in "A Power Factor Corrected MOSFET, Multiple Output, Flyback Switching Supply", Proceedings of the 10th International PCI, Chicago, Ill., 1985, pp. 19-32, which is hereby incorporated by reference. This power factor correction method is discussed further in reference to a gas discharge lamp ballast circuit disclosed in a copending U.S. patent application, Ser. No. 200,881, filed on June 2, 1988 by S.A. El-Hamamsy and assigned to the instant assignee. This patent application is hereby incorporated by reference. FIG. 4 is an illustration of a power factor correction circuit according to the above-referenced patent application, Ser. No. 200,881. In that circuit, AC power supply 10 drives a conventional full-wave diode bridge rectifier 12, the output terminals of which are connected across series-connected diode D1 and filter capacitor C1. A power factor correction transformer 20 connected in series with a diode D2 across capacitor C1 and energized from power electronics 16 charges capacitor C1 through diode D2 to half the value of the rectified line voltage $V_{LINE}$. Diode D1 is therefore reverse biased as long as the rectified line voltage is greater than the voltage across capacitor C1. When the AC source voltage goes below the rectified line voltage $V_{LINE}$, charge from capacitor C1 through diode D1 supplies gas discharge lamp 14 via power electronics 16. This arrangement effectively increases the conduction angle of the bridge rectifier to 120 degrees which, in turn, raises the power factor of the system to a value above 0.9. Advantageously, high inrush current is avoided through circuit devices comprising power electronics 16 by the controlled charging and discharging of filter capacitor C1. However, it would be desirable to achieve the same results without the necessity of including additional power control circuitry (not shown) to absorb transients.

Figure 5:
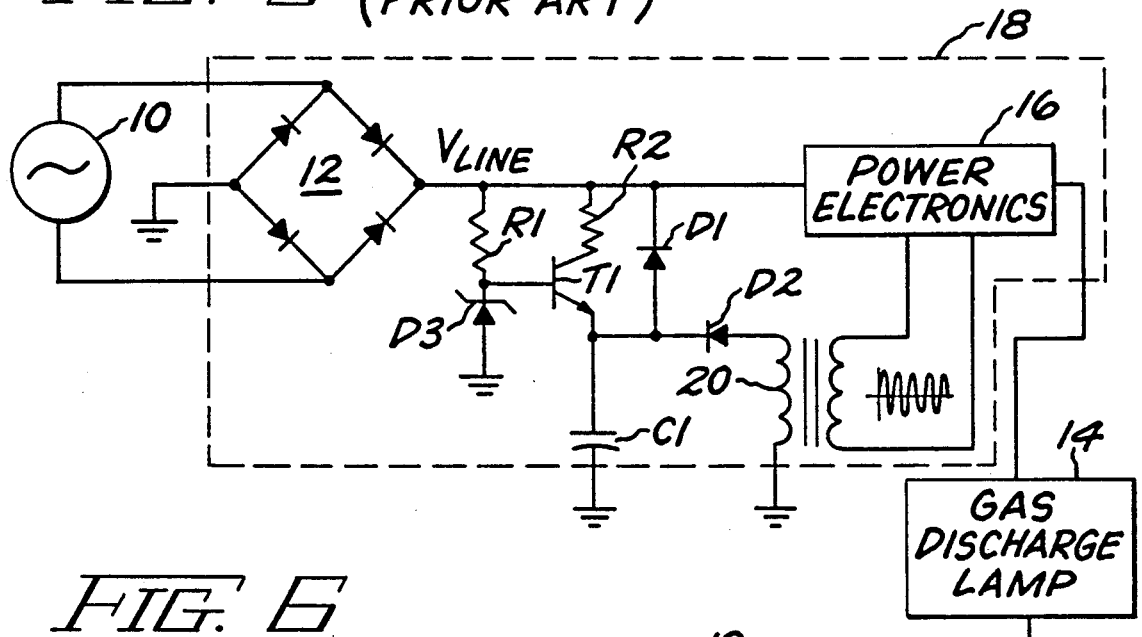
FIG. 5 is a schematic circuit diagram illustrating yet another power factor correction circuit known in the prior art.

An alternative method for controlling the charge of a filter capacitor to avoid high inrush current in an electronic ballast is by using a bootstrap circuit, such as the one illustrated in FIG. 5. This circuit differs from that of FIG. 4 in that it employs a transistor T1 having a collector load resistor R2. Capacitor C1 is pre-charged through resistor R2 and transistor T1. The base of transistor T1 is coupled to the line by a bias resistor R1. A Zener diode D3 is provided to maintain the base voltage of the transistor at some predetermined level above ground, thus improving circuit efficiency by turning off the transistor and hence the bootstrap circuit once the voltage across capacitor C1 exceeds the Zener diode breakdown voltage. Once transistor T1 is off, the capacitor becomes charged by power factor correction transformer 20 through diode D2. Diode D1 is reverse biased as long as the rectified line voltage is greater than the voltage across capacitor C1. When the AC source voltage goes below the rectified line voltage, charge from capacitor C1 through diode D1 supplies gas discharge lamp 14 via power electronics 16. Thus, like the circuit of FIG. 4, the conduction angle of diode bridge rectifier 12 is effectively increased to 120 degrees, and the power factor of the system is greater than 0.9. Disadvantageously, however, transistor T1 must be able to withstand high inrush currents and must likewise have a high breakdown voltage.

Figure 6:
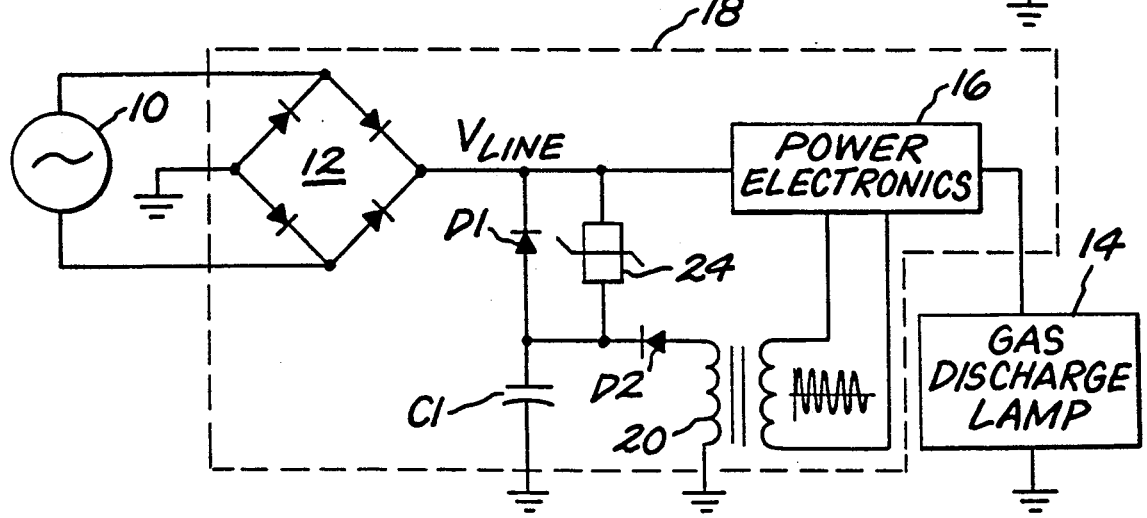
FIG. 6 is a schematic circuit diagram of a power factor correction circuit constructed in accordance with the present invention.

FIG. 6 illustrates one embodiment of the power factor correction circuit of the present invention. For this power circuit configuration, the circuitry of FIG. 4 is improved by connecting in parallel with diode D1 a varistor 24. In the preferred embodiment, varistor 24 comprises a metal oxide varistor (MOV) because of the MOV's fast response time and ability to withstand high voltage transients. More specifically, a metal oxide varistor is a two-terminal metal oxide semiconductor device having a voltage-dependent, non-linear resistance. When the voltage across the MOV is less than its breakdown voltage, the MOV has a high impedance value. In contrast, when the MOV breakdown voltage is exceeded, the MOV becomes a low impedance.

In operation, varistor 24 provides a low-impedance path for pre-charging capacitor C1. That is, as long as the input voltage $V_{LINE}$ from the line is greater than the sum of the varistor breakdown voltage and the voltage across the filter capacitor, diode D1 is reverse biased and varistor 24 provides a low-impedance path for pre-charging the capacitor. Once the capacitor is pre-charged to a pre-selected fixed voltage level, the capacitor charge is maintained by a power factor correction transformer 20 through diode D2. The power factor correction transformer is energized through power electronics 16. Thereafter, whenever the instantaneous AC source voltage goes below the rectified line voltage $V_{LINE}$, charge from capacitor C1 through diode D1 supplies the gas discharge lamp via power electronics 16. At all other times, the power electronics and the lamp are energized directly from the fully rectified voltage $V_{LINE}$.

After filter capacitor C1 is initially pre-charged, it is no longer charged through varistor 24 unless voltage $V_{LINE}$ exceeds the sum of the varistor breakdown voltage and the capacitor voltage. This occurs in the presence of a voltage transient at which time the MOV effectively acts as a short circuit that connects the capacitor across the line to absorb the transient, thus protecting devices of the circuit from the transients.

Figure 7:
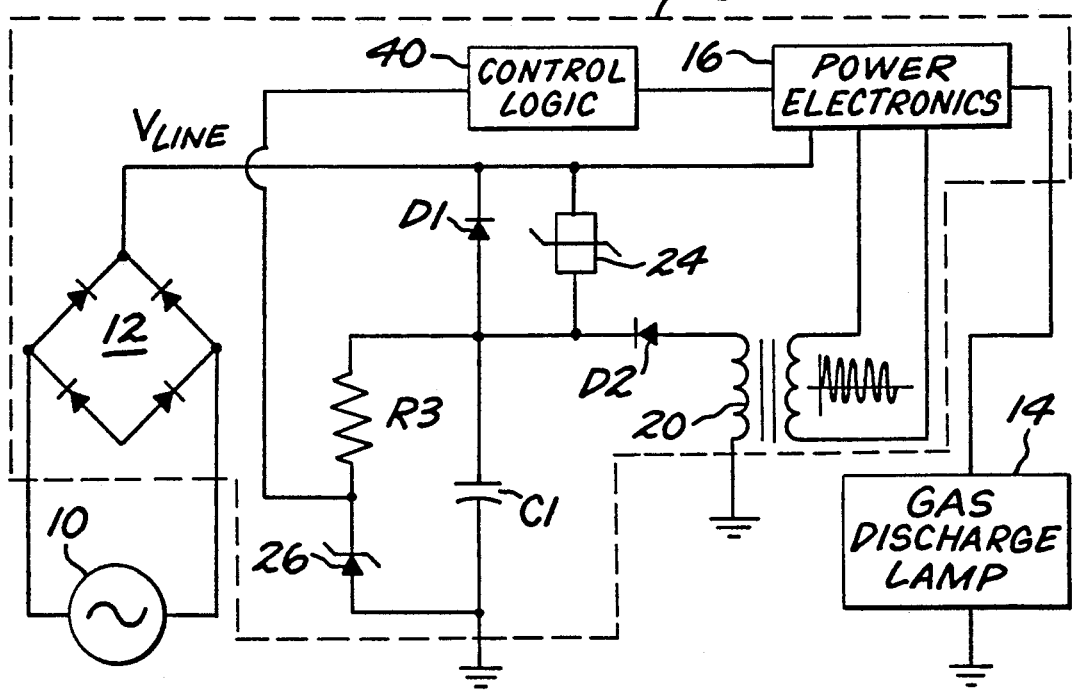
FIG. 7 is an alternative embodiment of the power factor correction circuit of FIG. 6.

An alternative embodiment of a power factor correction circuit in accordance with the present invention is illustrated in FIG. 7. This embodiment differs from that shown in FIG. 6 by employing a series combination of a Zener diode 26 and a resistor R3 in parallel with filter capacitor C1. As shown, the voltage signal at the cathode of the Zener diode is used to supply control logic 40 instead of voltage $V_{LINE}$. This provides an efficient means of providing a logic level voltage source to control logic 40 because use of the varistor results in a decreased voltage level across the capacitor than if the varistor were not otherwise being employed, thus resulting in a higher efficiency ballast circuit for the gas discharge lamp.

Figure 8:
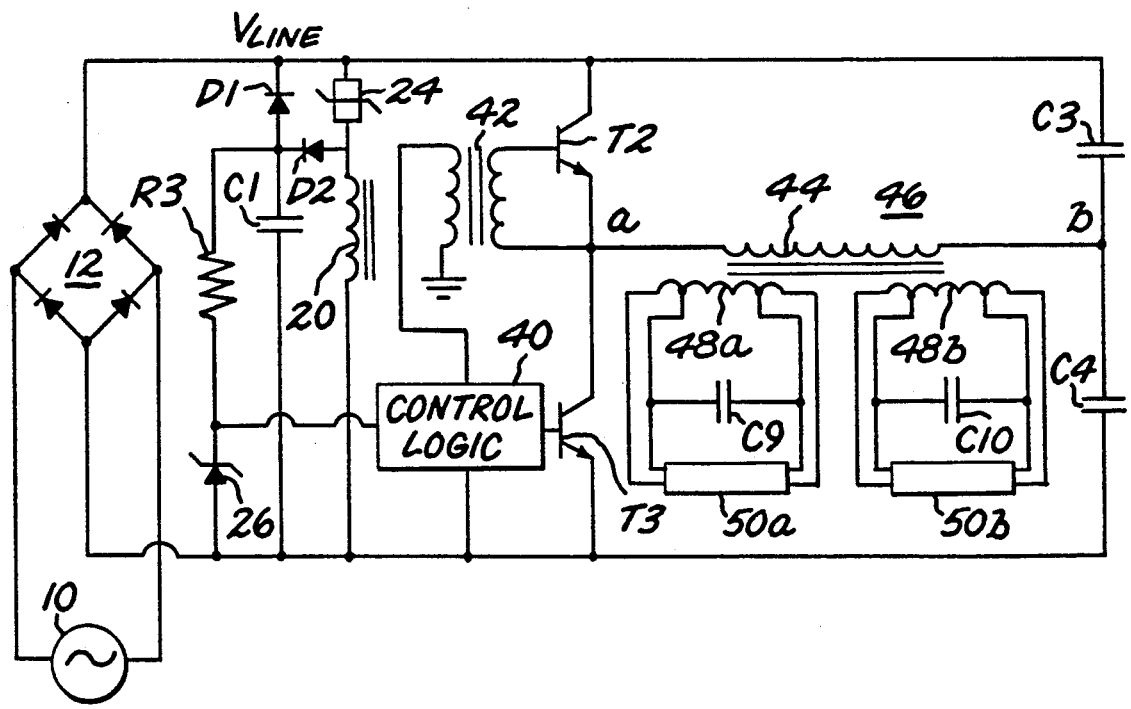
FIG. 8 is an alternative embodiment of the present invention employing a half bridge circuit configuration.

FIG. 8 illustrates another alternative embodiment of the present invention employed in a ballast circuit for driving two fluorescent lamps 50a and 50b. Like FIGS. 4–7, AC power supply 10 drives full-wave diode bridge rectifier 12 which is connected across series-connected diode D1 and filter capacitor C1. As described above in reference to FIG. 6, capacitor C1 is pre-charged through varistor 24 to a pre-selected fixed voltage level. Thereafter, power factor correction transformer 20 charges capacitor C1 through diode D2 to half the value of the rectified line voltage, $V_{LINE}$. Diode D1 is therefore reverse biased as long as the rectified line voltage is greater than the voltage across C1. When the AC source voltage goes below the rectified line voltage, charge from capacitor C1 supplies the power circuit through diode D1 at a voltage level equal to ½ $V_{LINE}$.

In the circuit of FIG. 8, control 40 drives converting transistors T2 and T3, connected in a half bridge configuration, at a start up frequency until the lamps ignite and at an operating frequency thereafter. Capacitors C3 and C4 are the converter half bridge capacitors for transistors T2 and T3, respectively. Control 40 may be implemented by any number of circuits well-known in the art for controlling half bridge resonant circuits. One possible embodiment of control 40 is illustrated in commonly assigned U.S. Pat. No. 4,672,528 of Park et al., which is hereby incorporated by reference. Although the circuit described in that patent is designed to control a full bridge connection of transistors, it may be suitably modified by one skilled in the art to control the half bridge circuit of FIG. 8. Transistors T2 and T3 convert the rectified DC voltage ($V_{LINE}$) to an AC voltage at a frequency determined by control 40. Isolation transformer 42 enables control 40 to drive both legs of the converter since transistor T2 is floating with respect to the control ground. Primary winding 44 of an isolation transformer 46 is connected between nodes a and b of the DC-to-AC converter. Primary winding 44 drives secondary windings 48a and 48b in an isolated series configuration. Capacitors C9 and C10 connected across lamps 50a and 50b, respectively, are selected to maximize the voltage across lamps 50a and 50b, respectively, at the start up frequency.

Preferably, a series combination of a Zener diode 26 and a resistor R3 is connected in parallel with filter capacitor C1. As discussed above in reference to FIG. 7, the voltage signal at the cathode of Zener diode 26 is the input signal to control 40 in order to improve the efficiency of the circuit.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A circuit for obtaining a high power factor electronically, comprising:
   a filter capacitor;
   capacitor pre-charging means, including a varistor electrically connected in series with said filter capacitor, coupled to an alternating current line voltage for precharging said filter capacitor to a preselected DC voltage level;
   a power factor correction winding coupled to said capacitor for maintaining the DC voltage level across said capacitor above said pre-selected DC voltage level; and
   coasting device means for supplying load current from said capacitor to a load alternately with the line voltage, said coasting device means being conductive when the voltage level across said capacitor exceeds the line voltage.

2. The circuit of claim 1 wherein said varistor comprises a metal oxide varistor.

3. The circuit of claim 2 wherein said coasting device means is connected in parallel with said varistor.

4. The circuit of claim 3 wherein said coasting device means comprises a diode.

5. The circuit of claim 1 further comprising a Zener diode connected in parallel with said filter capacitor.

6. An electronic ballast for a gas discharge lamp, comprising:

a filter capacitor;

rectifying means coupled to said filter capacitor for supplying a full wave rectified line voltage to a pair of unidirectional voltage supply terminals;

control circuit means connected to said unidirectional voltage supply terminals for supplying current to a negative resistance characteristic gas discharge lamp;

inductance means coupled to said control circuit means for limiting current into the gas discharge lamp;

capacitor pre-charging means, including a varistor electrically connected in series with said filter capacitor, coupled to the line voltage for pre-charging said filter capacitor to a pre-selected DC voltage level;

a power factor correction winding coupled to said capacitor for maintaining the DC voltage level across said capacitor above said pre-selected DC voltage level; and coasting device means for supplying load current from said capacitor to a load alternately with the line voltage, said coasting device means being conductive when the voltage level across said capacitor exceeds the line voltage.

7. The ballast of claim 6 wherein said varistor comprises a metal oxide varistor.

8. The ballast of claim 7 wherein said coasting device means is connected in parallel with said varistor.

9. The ballast of claim 8 wherein said coasting device means comprises a diode.

10. The ballast of claim 6 further comprising a Zener diode connected in parallel with said filter capacitor.

* * * * *